United States Patent [19]

Slee

[11] Patent Number: 4,969,425
[45] Date of Patent: Nov. 13, 1990

[54] PISTON WITH A RESONANT CAVITY

[75] Inventor: Roger H. Slee, Warwick, United Kingdom

[73] Assignee: T&N Technology Limited, Warwickshire, England

[21] Appl. No.: 369,737

[22] Filed: Jun. 21, 1989

[30] Foreign Application Priority Data

Jun. 25, 1988 [GB] United Kingdom ............... 8815183

[51] Int. Cl.⁵ ............................................. F02B 33/04
[52] U.S. Cl. ................................. 123/73 AA; 123/193 P
[58] Field of Search .......... 123/73 AA, 73 PP, 193 P, 123/26, 65 R, 73 FA

[56] References Cited

U.S. PATENT DOCUMENTS

| | | | |
|---|---|---|---|
| 1,046,359 | 12/1912 | Winton et al. | 123/73 AA |
| 1,483,619 | 2/1924 | Smith | 123/73 AA |
| 1,527,166 | 2/1925 | Bezu | 123/73 R |
| 1,535,433 | 4/1925 | Morrell | 123/73 AA |
| 4,016,839 | 4/1977 | Morton | 123/65 BA |
| 4,167,930 | 9/1979 | McNair, Jr. | 123/285 |
| 4,182,297 | 1/1980 | Ikenoya et al. | 123/73 A |
| 4,370,959 | 2/1983 | McNair, Jr. | 123/295 |

FOREIGN PATENT DOCUMENTS

| | | | |
|---|---|---|---|
| 4002432 | 3/1952 | France . | |
| 1022403 | 3/1953 | France | 123/73 AA |
| 1042370 | 10/1953 | France | 123/73 AA |
| 0008219 | 1/1977 | Japan | 123/73 A |
| 1544681 | 4/1979 | United Kingdom . | |
| 2057562A | 4/1981 | United Kingdom . | |

Primary Examiner—David A. Okonsky
Attorney, Agent, or Firm—Nixon & Vanderhye

[57] ABSTRACT

The invention relates to a piston for a cylinder of a two-stroke internal combustion engine, the engine having an auxiliary air inlet port which communicates with a cavity within the crown structure of the piston as the piston passes through bottom dead center. The air within the cavity is caused to resonate at high frequency, thereby enhancing the combustion process, enhancing low speed power, torque and evenness of engine running, and reducing or eliminating engine pre-combustion "knock".

8 Claims, 1 Drawing Sheet

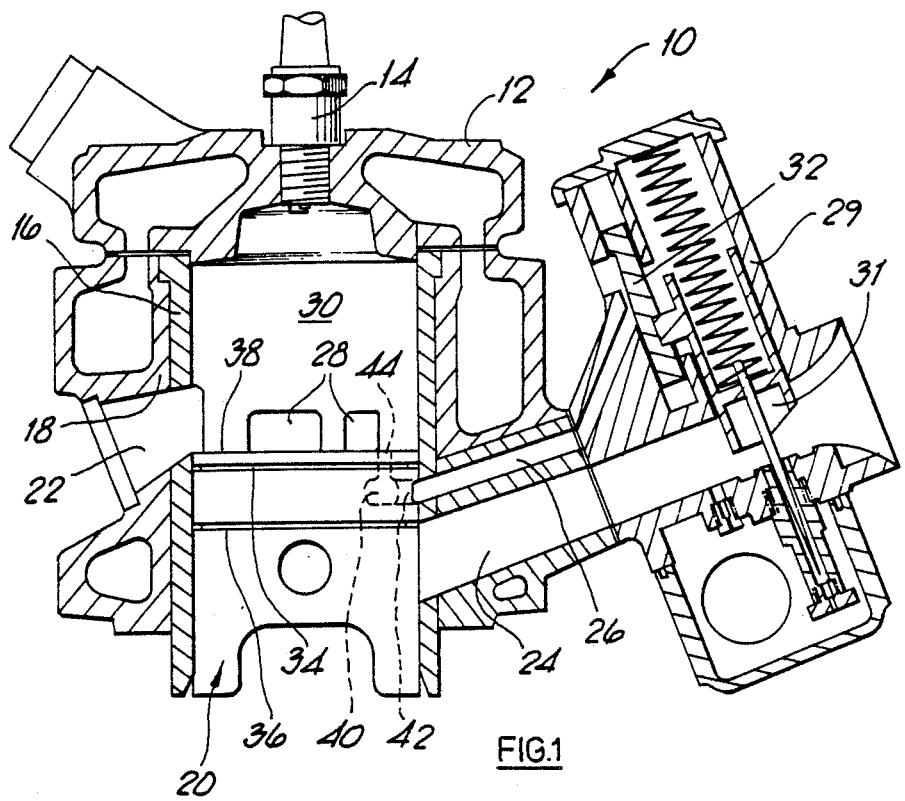
FIG.1
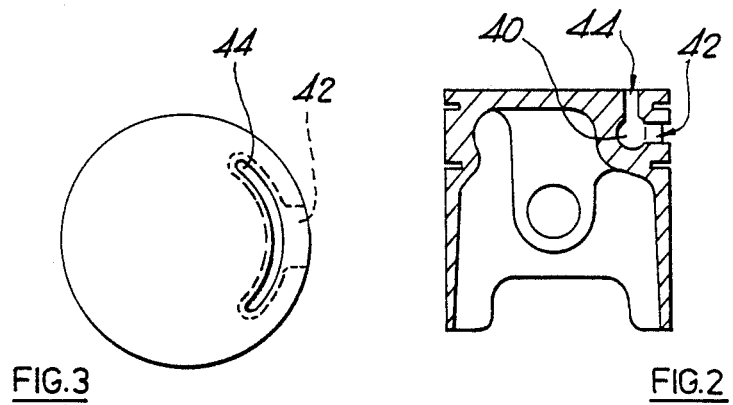
FIG.3
FIG.2

PISTON WITH A RESONANT CAVITY

The present invention relates to pistons for internal combustion engines and particularly to pistons for 2-stroke engines.

The characteristic irregular firing of gasoline fuelled, spark ignited two-stroke engines under light load is well known, as is poor torque and relatively heavy fuel consumption under these conditions.

A further aspect of the problem relates to the need to avoid an autocatalytic reaction wherein low fuel octane quality, excessive engine temperatures, inadequate scavenging or wrong air to fuel ratio can lead to damaging high frequency detonation of pockets of end gas (so called 'combustion knock'); and where detonation shock waves sweep through the charge, causing slowing of flame speed, sharply increasing local heat transfer and turbulence values, leading to serious damage.

The use of pistons having fixed external cavities in the crown region are known. Such external cavities form part of a resonant system with the combustion chamber. An engine with a piston having such an external cavity is described in U.S. Pat. No. 4,370,959. The external cavity, however, is formed by a cap on the piston crown and which cap significantly interferes with the gas flow during the induction and exhaust phases.

It is an object of the present invention to provide a two stroke engine and a piston having a slightly concave, flat or slightly convex crown and which piston does not suffer from the above disadvantages. The requirement for a slightly concave, flat or slightly convex crown is to ensure that the vital scavenging gas flows are not significantly impaired.

A further object of the present invention is to achieve stable, regular combustion at low revolution speeds and light load, thereby improving fuel economy, torque, engine flexibility and hydrocarbon emissions.

According to a first aspect of the present invention a two-stroke internal combustion engine comprises a cylinder for receiving a piston, a piston in said cylinder, a combustion chamber having ignition means, means for inducing a combustible air and fuel charge into the engine, scavenge-port means for transferring the combustible charge into the combustion space above the piston, exhaust-port means for disposing of exhaust gases, the engine being characterised by having auxiliary-port means for the controlled admission of air into a cavity within the structure of the piston crown when the piston is passing through the lower dead centre region of its travel.

Preferably the opening of the auxiliary-port means is controlled by a valve which modulates the flow of air to the cavity within the structure of the piston crown by allowing less air to pass as the engine speed and load rises. Such a valve may be a relatively simple air proportioning valve activated by a slide in the engine carburettor intake or may be an electronically controlled valve depending upon engine speed, for example.

According to a second aspect of the present invention there is provided a piston for the first aspect, the piston comprising a crown portion and a skirt portion and wherein the crown portion includes a cavity lying beneath the crown surface but within the crown structure, said cavity having a first passage adapted to co-operate with an auxiliary air induction port in the cylinder wall of a two-stroke engine and a second passage communicating with the swept cylinder volume of the engine.

Preferably the piston may have at least two piston rings one being positioned above said first passage and the second being positioned below said first passage.

The cavity and second passage form part of a system transiently resonant with the compressed combustion gas volume of the cylinder near TDC as will be described below.

The radial width of the second passage, when in the form of an arcuate slot to match geometrically the compression space 'squish' zone, may lie in the range from 1.5 to 2.5 mm for most engines. This dimensional range may, however, be exceeded for some engines. The length of the arcuate slot may vary depending upon the specific engine and the compression space geometry at TDC.

In order that the present invention may be more fully understood an example will now be described by way of illustration only with reference to the accompanying drawings, of which:

FIG. 1 shows a part cross section in elevation of an engine, piston and carburettor according to the present invention;

FIG. 2 shows a cross section in more detail of the piston of FIG. 1; and

FIG. 3 shows a plan view of the crown surface of the piston of FIG. 2.

Referring now to the drawings and where the same features are denoted by common reference numerals:

Part of a loop scavenged two-stroke gasoline engine is shown generally at 10. The engine comprises a cylinder head 12 having a spark-plug 14, a cylinder liner 16 and a cylinder jacket 18. A piston 20 is contained within the cylinder 16. The engine also has the usual connecting rod, crankshaft, and crankcase (all not shown). The cylinder liner 16 and jacket 18 have co-operating apertures defining an exhaust port 22, inlet port 24 for the main combustible charge and an auxiliary air inlet port 26. The inlet port 24 communicates with a carburettor 29 and throttle valve 31. The liner 16 also has scavenge ports 28 to transfer the induced charge from the crankcase (not shown) to the swept cylinder volume 30. A proportioning valve 32 controls admission of air to the auxiliary air port 26. The piston 20 has two piston rings 34 and 36. The top ring 34 is near to the crown surface 38 to reduce the top piston ring land crevice volume to a minimum. Within the structure of the piston crown is a cavity 40 which has a first passage 42 which communicates in the region of inner or bottom dead centre with the auxiliary air inlet port 26. A second passage 44 in the shape of an arcuate slot communicates with the swept cylinder volume 30. The passage 44 has a radial width of about 1.8 mm and an arcuate extent in plan of about 90°. The second piston ring 36 lies below the first passage 42. The cavity 40 and first passage 42 are shown in FIG. 3 by dashed lines. The piston 20 is shown in the bottom dead centre position.

In operation air/fuel mixture is admitted to the engine cylinder via the throttle valve 31, the normal induction port 24 and scavenge ports 28. Auxiliary air is also admitted via the air proportioning valve 32, the air port 26, cavity 40 and communicating passage 44, to the cylinder.

This auxiliary air supply is proportioned by means of the proportioning valve 32 relative to the main fuel/air mixture supply so as to have a maximum value at small throttle openings, progressively decreasing to a minimum value at or near wide open throttle. Such an augmentation of the air/fuel charge by supplementary air in this manner has a large stabilising effect on successive combustion events particularly under conditions of light load or low revolution speed. by raising the rotional volumetric efficiency and the compression ratio, whilst decreasing the charge dilution with burnt gas from a prior working cycle.

Any air not directly short circuited to the cylinder from the cavity 40 during the air transfer phase, will tend to remain in the cavity during the compression stroke of the piston. Upon approaching the top centre position, a sharp fronted pressure wave spontaneously excited by the ignition/combustion sequence, bucks and drives the air in the cavity 40 into transient resonance.

The resonant cavity system is proportioned such that its natural frequency is approximately equal to the fundamental knock frequency of the cylinder/cylinder head combination of the engine in question (for a discussion of knock frequency, see article entitled "Knock-induced Cavity Resonance in Open Chamber Diesel Engines" by R. Hickling et al., J. Acoust Soc. Am. Vol. 65, No. 6, June 1979 (p. 1474)), and thus approximately obeys the characteristics of a Helmholtz resonator:

$$f = \frac{c}{2\pi} \sqrt{\frac{A}{LVK}} \text{ Hz}$$

where
c = the speed of sound in the combustion gas
A = the area of the necked passage 44 square to the flow
L = the effective throat coupling length of the passage 44
V = the resonant volume of the cavity 40
K = a modifying constant to broaden frequency response band.

Because of the close proximity of the cavity to the cylinder head, the latter may require local contouring to avoid excessive damping and permit adequate exchange of the transient pressure waves between the resonant cavity and the combustion gas around top dead centre.

Any incipient "knock waves" in the cylinder are thus presented with a counter wave sysytem of approximately identical frequency, resulting in a rapid decay of both the resonant and knock waves. This artificially induced damping greatly reduces the likelihood of detonation damage.

The main combustion and scavenging events are not adversely affected, and turbulent air motion within the piston cavity raises local heat transfer coefficients to avoid excessive piston temperatures.

I claim:

1. A two-stroke internal combustion engine comprising a cylinder, with a co-operating piston having a crown structure, ignition means, means for inducing a combustible air and fuel charge into the engine, normal scavenge-port means for transferring the combustible charge into the cylinder volume above the piston, exhaust-port means for disposing of exhaust gases, the engine being characterised by having auxiliary air port passage means for the controlled admission of air into a plenum chamber defined within the crown structure of the piston when the piston is passing through the lower dead centre region of its travel, said plenum chamber also being in communication with the cylinder volume above the piston via a necked passage, and the plenum chamber and the necked passage form part of a system transiently resonant with the high pressure combustion gas volume in the cylinder around the upper dead centre position at a resonant frequency substantially coincident to a fundamental knock frequency of the combination of the cylinder and cylinder head.

2. An engine according to claim 1 wherein the auxiliary air is controlled by an air proportioning valve operably connected to the carburetor.

3. An engine according to claim 1 wherein the auxiliary air is controlled by an electronically controlled valve depending upon engine speed.

4. A piston for a two-stroke engine, the piston comprising a crown portion and a skirt portion and wherein the crown portion includes a plenum chamber defined beneath the crown surface within the crown structure, said plenum chamber having a first passage adapted to co-operate with an auxiliary air induction port in the cylinder wall of the engine and a second passage communicating with the swept cylinder volume of the engine, wherein said plenum chamber and second passage form part of a system transiently resonant with the high pressure combustion gas volume in the cylinder near top dead centre at a resonant frequency substantially coincident with a fundamental knock frequency of the combination of the cylinder and cylinder head.

5. A piston according to claim 4 wherein said second passage is in the form of an arcuate slot.

6. A piston according to claim 5 wherein the width of the slot lies in the range from 1.5 to 2.5 mm.

7. A piston according to claim 5 wherein the arcuate slot extends to about 90° in the circumferential direction.

8. A piston according to claim 4 wherein the piston has at least two piston rings one each of which lies either side of the first passage.

* * * * *